United States Patent [19]
Tanabe

[11] Patent Number: 5,392,085
[45] Date of Patent: Feb. 21, 1995

[54] FOCAL-PLANE SHUTTER APPARATUS

[75] Inventor: Yoshiaki Tanabe, Kawasaki, Japan

[73] Assignee: Nikon Corporation, Tokyo, Japan

[21] Appl. No.: 65,257

[22] Filed: May 21, 1993

[30] Foreign Application Priority Data

Jun. 2, 1992 [JP] Japan .................................. 4-166886
Jun. 3, 1992 [JP] Japan .................................. 4-168585

[51] Int. Cl.⁶ .............................................. G03B 9/40
[52] U.S. Cl. .................................................. 354/247
[58] Field of Search .............. 354/242, 245, 246, 247, 354/248, 249

[56] References Cited

U.S. PATENT DOCUMENTS

| 4,458,998 | 7/1984 | Tanaka et al. ...................... 354/154 |
| 4,657,366 | 4/1987 | Tanabe et al. ...................... 354/246 |
| 4,668,065 | 5/1987 | Tanaka et al. ...................... 354/152 |

FOREIGN PATENT DOCUMENTS 4-175736 6/1992 Japan .
4-361243 12/1992 Japan .

Primary Examiner—Howard B. Blankenship
Attorney, Agent, or Firm—Shapiro and Shapiro

[57] ABSTRACT

A focal-plane shutter apparatus is arranged such that, from a state that an image plane is substantially doubly covered with a first vane group and a second vane group and with release of camera, the second vane group withdraws outside the image plane and thereafter the first vane group starts running for exposure, and comprises a balancer member moving in the opposite direction to the withdrawal direction of the second vane group in synchronism with the withdrawal of the second vane group outside the image plane, and a start adjusting member for substantially simultaneously starting the withdrawal of the second vane group outside the image plane member and the movement of the balancer member, thereby enabling full use of performance of the balancer for reducing camera shake during the withdrawal of second vane group.

5 Claims, 17 Drawing Sheets (WHEN EXPOSURE COMPLETED)

(WHEN EXPOSURE COMPLETED)

(WHEN EXPSURE PERFORMED)

FIG. 16 (WHEN EXPOSURE COMPLETED)

FOCAL-PLANE SHUTTER APPARATUS

BACKGROUND OF THE INVENTION

1. Field of the Invention

The present invention relates to a focal-plane shutter apparatus for camera.

2. Related Background Art

There has already been proposed a shutter apparatus of this type (in commonly assigned U.S. patent application Ser. No. 787,089), "which simultaneously releases by means of a return stop lever a return lever for returning (withdrawing) a second vane group and a balancer lever for starting a balancer."

The shutter apparatus as disclosed in U.S. patent application Ser. No. 787,089, however, failed to make full use of the camera shake prevention function with mounted balancer, because shape errors and assembling errors of the return stop lever, return lever, or balancer lever interfere with simultaneous engagement release of the levers so that the withdrawal of second vane group outside the image plane and the movement of balancer cannot be simultaneously started or stopped.

SUMMARY OF THE INVENTION

It is an object of the present invention to provide a focal-plane shutter apparatus which can make full use of performance of a balancer for suppressing camera shake during withdrawal of second vane group.

To achieve the object, the present invention provides, in one of its aspects, a focal-plane shutter apparatus so arranged that, from a state that an image plane is substantially doubly covered with a first (front) vane group 100 and a second (rear) vane group 101 and with release of camera, the second vane group withdraws outside the image plane and thereafter the first vane group starts running for exposure, which apparatus comprises a balancer member 54 moving in the opposite direction to the withdrawal direction of the second vane group in synchronism with the withdrawal operation of the second vane group outside the image plane, and start adjusting means 22b for substantially simultaneously starting the withdrawal of the rear vane group outside the image plane and the movement of the balancer member.

In one form of the present invention, the start adjusting means is an eccentric pin provided in a mirror rise and aperture transmission path.

In another of its aspects, the present invention provides a focal-plane shutter apparatus so arranged that, from a state that an image plane is substantially doubly covered with a first vane group 100 and a second vane group 101 and with release of camera, the second vane group withdraws outside the image plane and thereafter the first vane group starts running for exposure, which apparatus comprises a balancer member 54 moving in the opposite direction to the withdrawal direction of the second vane group in synchronism with the withdrawal operation of the second vane group outside the image plane, and stop adjusting means 85 for substantially simultaneously stopping the withdrawal of the rear vane group outside the image plane and the movement of the balancer member.

In one form of the present invention, the stop adjusting means is an eccentric pin for regulating a stop position of the balancer member.

According to the present invention, the movement of the balancer member may be substantially simultaneously started or stopped with the withdrawal of the second vane group outside the image plane, so that the camera shake prevention function with the balancer member may be made fully effective.

Also in the present invention, with the stop adjustment function for a balancer lever, the substantially simultaneous stop is possible without occurrence of shutter running unevenness.

DESCRIPTION OF THE PREFERRED EMBODIMENTS

An embodiment of the present invention will be described in detail with reference to the accompanying drawings.

FIG. 1 to FIG. 18 show a focal-plane shutter apparatus according to the present invention.

Figure 18:
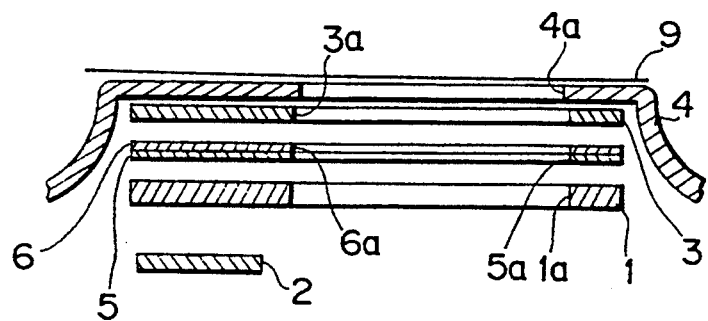
FIG. 18 is a cross sectional view along the A—A line in FIG. 17.

In FIG. 18, the shutter apparatus of the present embodiment has a base 1, on which a control base 2, a cover plate 3, and diaphragms 5, 6 are mounted by conventional means. The base 1, the cover plate 3, and the diaphragms 5, 6 have photographic openings 1a, 3a, 5a, and 6a, respectively.

A first or front vane group 100 as shown in FIG. 13 to FIG. 16 is housed between the base 1 and the diaphragm 5. A second or rear vane group 101 as shown in FIG. 13 to FIG. 16 is housed between the diaphragm 6 and the cover plate 3. The diaphragms 5, 6 are omitted in FIG. 13 to FIG. 16 to facilitate the view of the first vane group 100 and the second vane group 101.

Further, members as shown in FIG. 7 to FIG. 12 are mounted on the base 1. Members as shown in FIG. 1 to FIG. 6 are mounted on the control base 2.

The shutter apparatus so arranged is installed in the camera body 4 by conventional procedure. The camera body 4 has a photographic opening 4a and a recess 4b, 4c, 4d formed as shown in FIG. 17 for mounting of a finder member.

Figure 17:
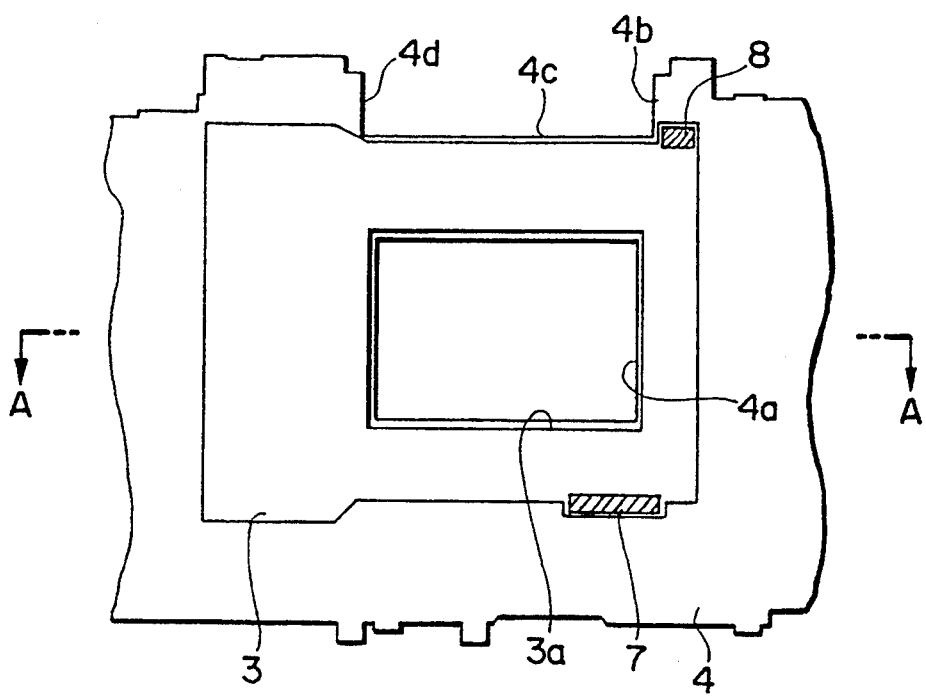
FIG. 17 is a drawing to show a mount state of the shutter apparatus of the embodiment on a camera body.

The base 1, the control base 2, and the diaphragms 5, 6 are omitted in FIG. 17. to facilitate the view thereof. The base 1 and the diaphragms 5, 6 have substantially the same shape as the cover plate 3. FIG. 18 is a cross sectional view along the A—A line in FIG. 17, in which numeral 9 denotes a film.

Next explained in detail is the internal structure of the shutter apparatus of the present embodiment.

Figure 7:
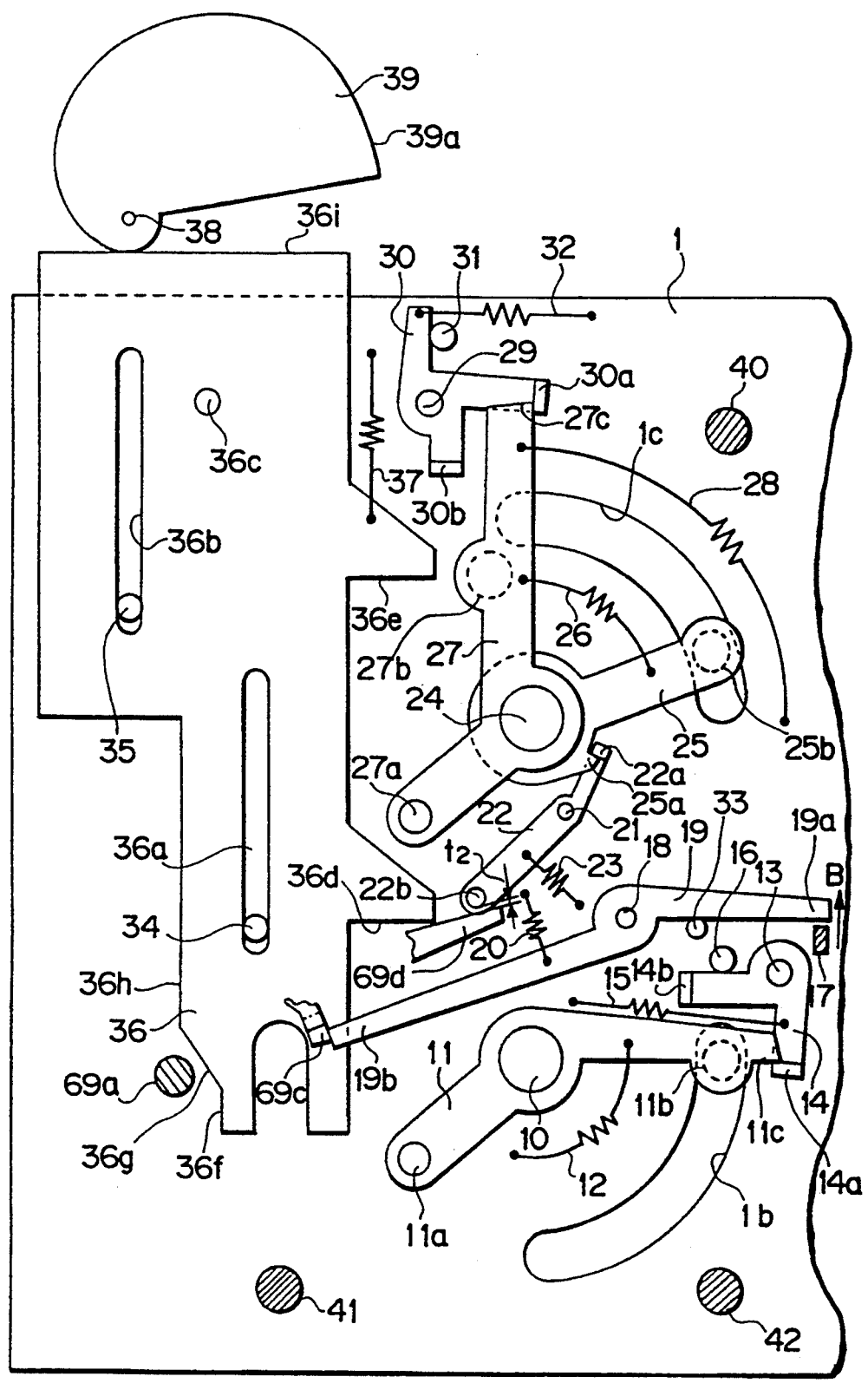
FIG. 7 is a drawing to show a drive system of the shutter apparatus in the embodiment.

In FIG. 7, shafts 10, 13, 18, 21, 24, 29, pins 16, 31, 33, 34, 35, and struts 40, 41, 42 are fixed in the base 1. Arc holes 1b, 1c are perforated through the base 1.

A first drive lever 11 is rotatable about the shaft 10 and urged clockwise by a spring 12. Pins 11a, 11b are fixed in the first drive lever 11.

A first stop key 14 is rotatable about the shaft 13 and urged clockwise by a spring 15. Further, the first stop key 14 has folded portions 14a, 14b, and the folded portion 14a is engaged with and stops a claw 11c of the first drive lever 11. The pin 16 positions the first stop key 14 against a biasing force of the spring 15. By this, an engagement amount between the claw 11c and the folded portion 14a is always kept constant.

An inertia body stop key 19 is rotatable about the shaft 18 and urged clockwise by a spring 20. An arm 19b of the inertia body stop key 19 is engaged with and stops a claw 69c of an inertia body 69 as described later. The pin 33 positions the inertia body stop key 19 against a biasing force of the spring 20.

A second drive lever 27 is rotatable about the shaft 24 and urged clockwise by a spring 28. Pins 27a, 27b are fixed in the second drive lever 27.

A return lever 25 is rotatable about the shaft 24 and urged counterclockwise by a spring 26. The other end of the spring 26 is fixed to the second drive lever 27. Thus, the second drive lever 27 is urged clockwise also by the spring 26. A pin 25b is fixed in the return lever 25.

A second stop key 30 is rotatable about the shaft 29 and urged clockwise by a spring 32. Further, the second stop key 30 has folded portions 30a, 30b, and the folded portion 30a is engaged with and stops a claw 27c of the second drive lever 27. The pin 31 positions the second stop key 30 against a biasing force of the spring 32. By this, an engagement amount between the claw 27c and the folded portion 30a is always kept constant.

A return stop key 22 is rotatable about the shaft 21 and urged counterclockwise by a spring 23. The return stop key 22 has a folded portion 22a and a pin 22b fixed therein. The folded portion 22a is engageable with a claw 25a of a return lever 25 as described later, and the pin 22b is an eccentric pin which is engageable with an arm 69d of the inertia body 69 as described later. As the pin 22b is rotated, a clearance $t_2$ between the pin 22b and the arm 69d changes.

A charge plate 36 has a pin 36c fixed therein and elongate holes 36a, 36b perforated therethrough. Pins 34, 35 are fit in the elongate holes 36a, 36b, respectively. Accordingly, the charge plate 36 can move only in the vertical direction. The charge plate 36 is urged upward by a spring 37.

A cam 39 is rotatable about a shaft 38 provided on the camera body 4, and a cam face 39a contacts with an upper end plane 36i of the charge plate 36.

Figure 1:
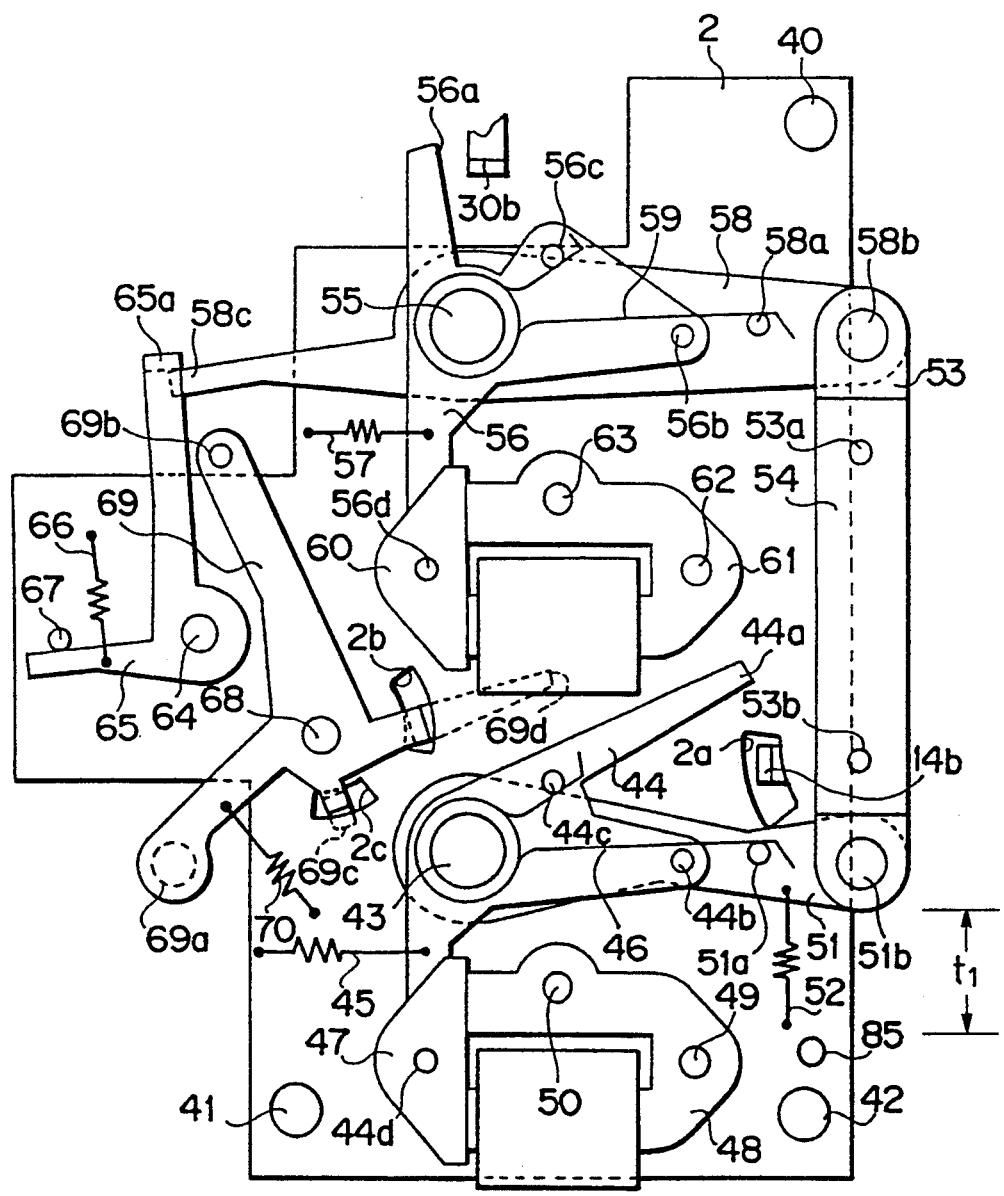
FIG. 1 is a drawing to show a control system in an embodiment of a focal-plane shutter apparatus according to the present invention.

Now turning to FIG. 1, the control base 2 is supported by the struts 40, 41, 42. The control base 2 has arc holes 2a, 2b, 2c, in which shafts 43, 55, 64, 68 and pins 49, 50, 62, 63, 67 are fixed.

A first magnet 48 and a second magnet 61 are fixed on the control base 2 through pins 49, 50 and pins 62, 63, respectively.

A first armature lever 44 is rotatable about the shaft 43 and urged clockwise by a spring 45. An arm 44a of the first armature lever 44 is engageable with the above-described folded portion 14b extending upward through the arc hole 2a. Also, pins 44b, 44c, 44d are fixed in the first armature lever 44, and an iron piece 47 is attached to the pin 44d.

A first overcharge lever 51 is rotatable about the shaft 43 and urged clockwise by a spring 52. A pin 51a and a shaft 51b are fixed in the first overcharge lever 51.

The first overcharge spring 46 is hooked on the pin 44c at one end thereof and on the pin 51a at the other end thereof. The overcharge spring 46 urges the first armature lever 44 counterclockwise with a stronger force than the aforementioned spring 45. The iron piece 47 is urged by this force against the first magnet 48.

A second armature lever 56 is rotatable about a shaft 55 and urged clockwise by a spring 57. An arm 56a of the second armature lever 56 is engageable with the aforementioned folded portion 30b. Also, pins 56b, 56c, 56d are fixed in the second armature lever 56, and an iron piece 60 is attached to the pin 56d.

A second overcharge lever 58 is rotatable about the shaft 55 and urged clockwise by an action of the spring 52. A pin 58a and a shaft 58b are fixed in the second overcharge lever 58.

A second overcharge spring 59 is hooked on the pin 56c at one end thereof and on the pin 58a at the other end thereof. The second overcharge spring 59 urges the second armature lever 56 counterclockwise with a stronger force than the aforementioned spring 57. The iron piece 60 is urged by this force against the second magnet 61.

A link 53 is rotatably mounted on the shafts 51b, 58b. A balancer weight 54 is fixed through pins 53a, 53b on the link 53. Namely, a quadric link work is constituted by the control base 2, the first overcharge lever 51, the second overcharge lever 58, and the link 53.

A balancer stop key 65 is rotatable about the shaft 64 and urged clockwise by a spring 66. The balancer stop key 65 has a folded portion 65a, which is engaged with and stops a claw 58c of the second overcharge lever 58. A pin 67 positions the balancer stop key 65 against a biasing force of the spring 66. By this, an engagement amount between the claw 58c and the folded portion 65a is kept constant.

The inertia body 69 is rotatable about the shaft 68 and urged counterclockwise by a spring 70. Pins 69a, 69b are fixed on the inertia body 69. One pin 69a is engageable with end planes 36f, 36g, 36h of the charge plate 36 (see FIG. 7), and the other pin 69b is engageable with the balancer stop key 65.

Figure 13:
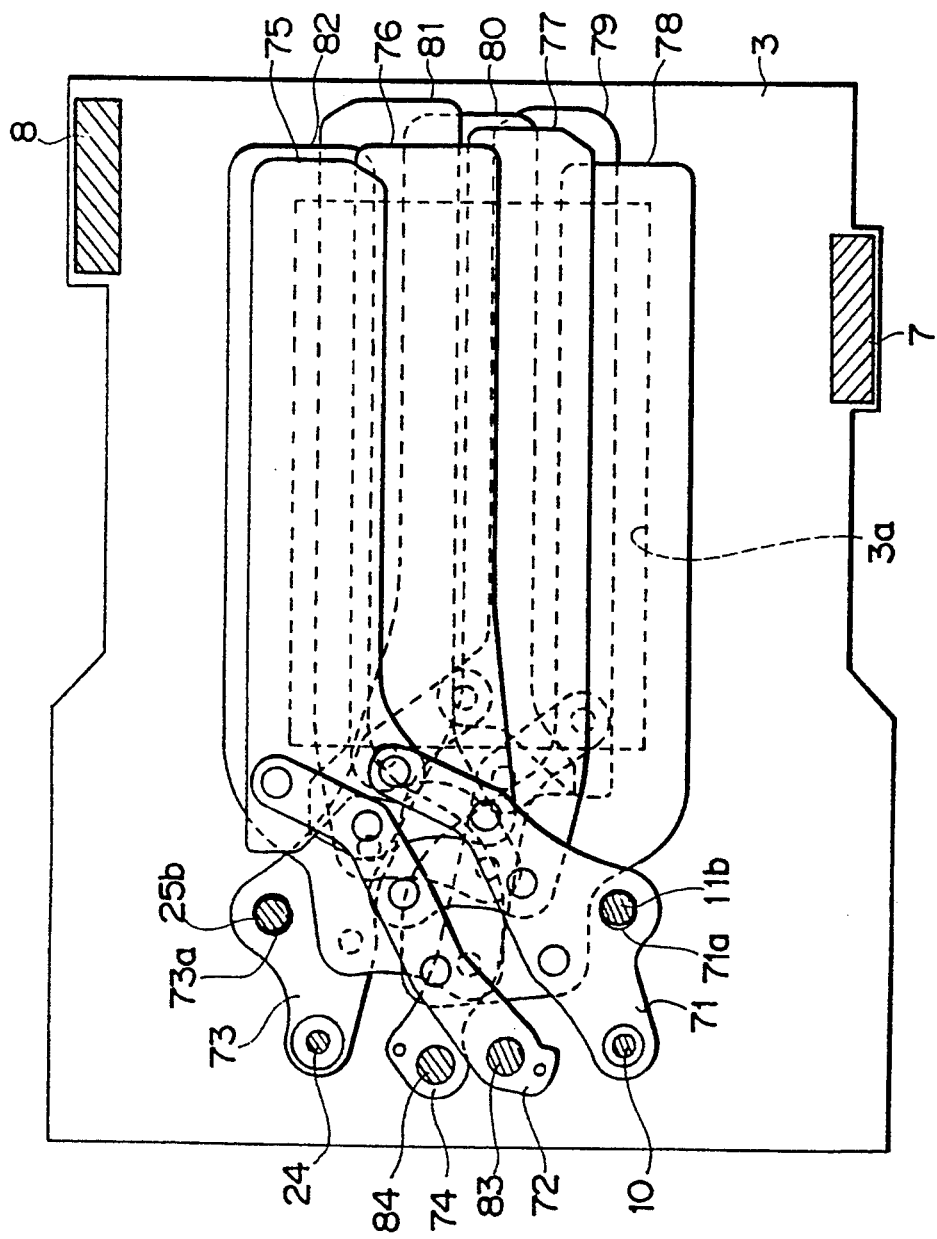
FIG. 13 is a drawing to show a vane system of the shutter apparatus in the embodiment.

Now referring to FIG. 13, the constitution of shutter vanes is described.

A first drive arm 71 is rotatable about the shaft 10 and has a pin hole 71a. The aforementioned pin 11b is fit in the pin hole 71a. A first driven arm 72 is rotatable about the shaft 83 fixed in the base 1.

A second drive arm 73 is rotatable about the shaft 24 and has a pin hole 73a. The aforementioned pin 25b is fit in the pin hole 73a. A second driven arm 74 is rotatable about the shaft 84 fixed in the base 1.

Figure 15:
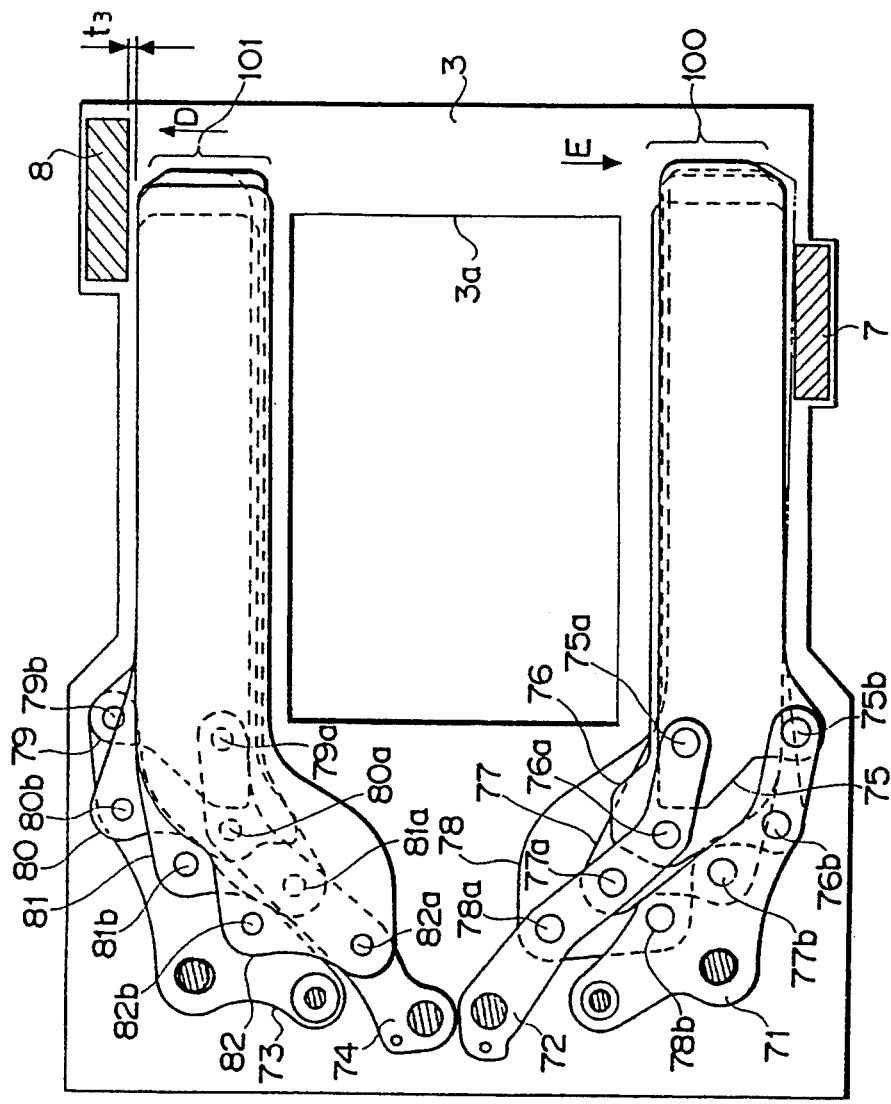
FIG. 15 is a drawing to show the vane system of the shutter apparatus in the embodiment.

Setting of shutter vanes is now explained with FIG. 15.

A front slit-forming vane 75, a front second vane 76, a front third vane 77, and a front fourth vane 78 are rotatably mounted on the first driven arm 72 through shafts 75a, 76a, 77a, 78a, respectively, and on the first drive arm 71 through shafts 75b, 76b, 77b, 78b, respectively.

A rear slit-forming vane 79, a rear second vane 80, a rear third vane 81, and a rear fourth vane 82 are rotatably mounted on the rear driven arm 74 through shafts 79a, 80a, 81a, 82a, respectively, and on the rear drive arm 73 through shafts 79b, 80b, 81b, 82b, respectively.

The aforementioned first vane Group 100 comprises the front slit-forming vane 75, the front second vane 76, the front third vane 77, the front fourth vane 78, the shafts 75a, 76a, 77a, 78a, 75b, 76b, 77b, 78b, the first drive arm 71, and the first driven arm 72.

Similarly, the second vane Group 101 comprises the rear slit-forming vane 79, the rear second vane 80, the rear third vane 81, the rear fourth vane 82, the shafts 79a, 80a, 81a, 82a, 79b, 80b, 81b, 82b, the second drive arm 73, and the second driven arm 74.

The first vane Group and the second vane group constitute a parallel link mechanism as well known.

An operation of the shutter apparatus of the embodiment is next described according to a photographic sequence.

The shutter apparatus is in the state as shown in FIG. 1, FIG. 7 and FIG. 13 upon completion of photographic preparation. When an unrepresented shutter button, which is set in the camera body 4, is pressed from this state, the first magnet 48 and the second magnet 61 are first energized to attract and hold the iron piece 47 and the iron piece 60, respectively. Then, a stop down operation is performed and the mirror is raised. The lever 17 mounted on the camera body 4 moves in the direction of arrow B as shown in FIG. 7 in synchronism with this motion.

Then, the arm 19a of the inertia body stop key 19 comes to engage with the lever 17, so that the inertia body stop key 19 rotates counterclockwise against the spring 20. By this, the engagement between the arm 19b and the claw 69c is released.

This release causes the inertia body 69 as shown in FIG. 1 to rotate counterclockwise with the action of the spring 70. Soon after, the pin 69b comes to contact with the balancer stop key 65, and rotates it counterclockwise against the biasing force of the spring 66. Then, the engagement between the claw 58c of the second overcharge lever 58 and the folded portion 65a is released.

Also, the arm 69d of the inertia body 69 comes to contact with the pin 22b of the return stop key 22 as shown in FIG. 7, and rotates it clockwise against the biasing force of the spring 23. Then, the engagement between the claw 25a of the return lever 25 and the folded portion 22a is released.

Figure 2:
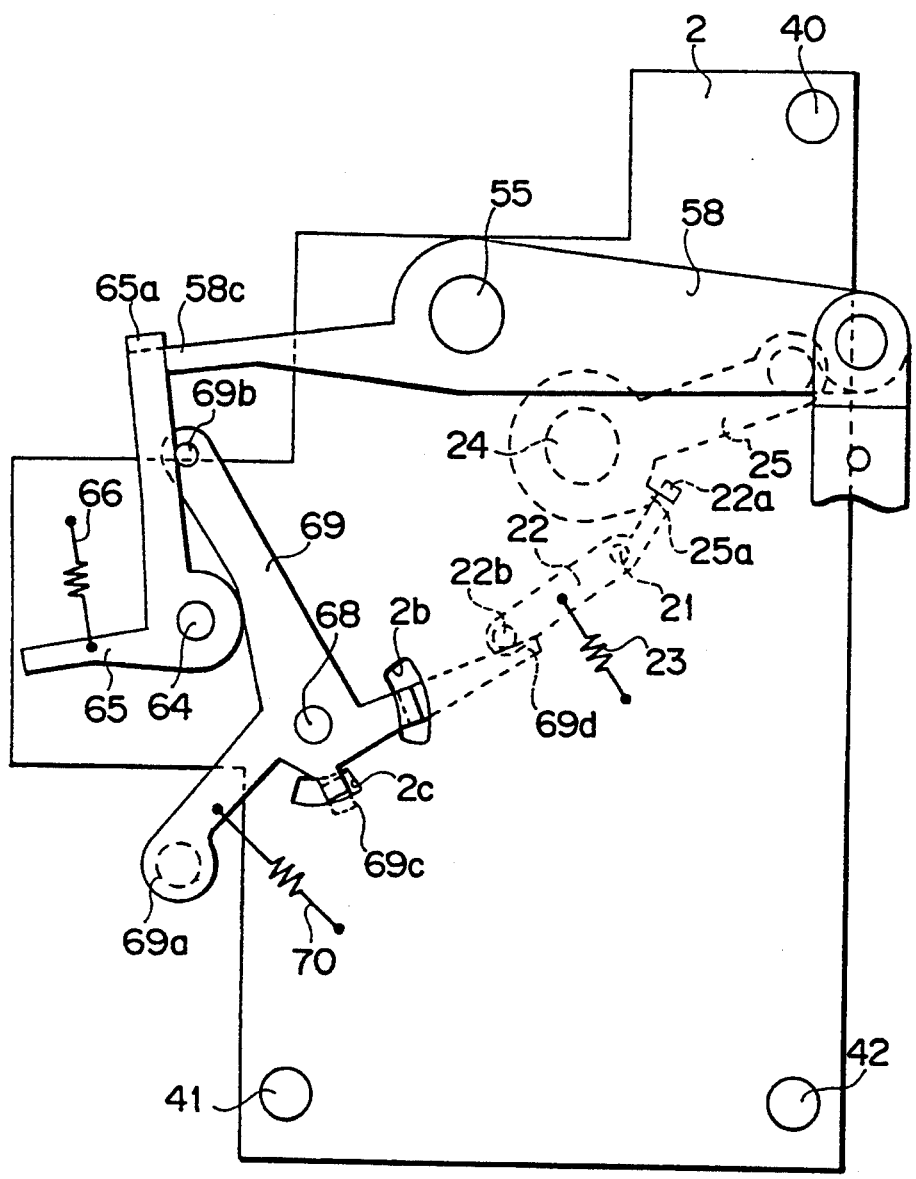
FIG. 2 is a drawing to show the control system of the shutter apparatus in the embodiment.

The engagement release between the claw 58c and the folded portion 65a and the engagement release between the claw 25a and the folded portion 22a are substantially simultaneously performed as shown in FIG. 2. Namely, a clearance $t_2$ (FIG. 7) is adjusted by rotating the pin 22 so as to effect the simultaneous engagement release.

Figure 3:
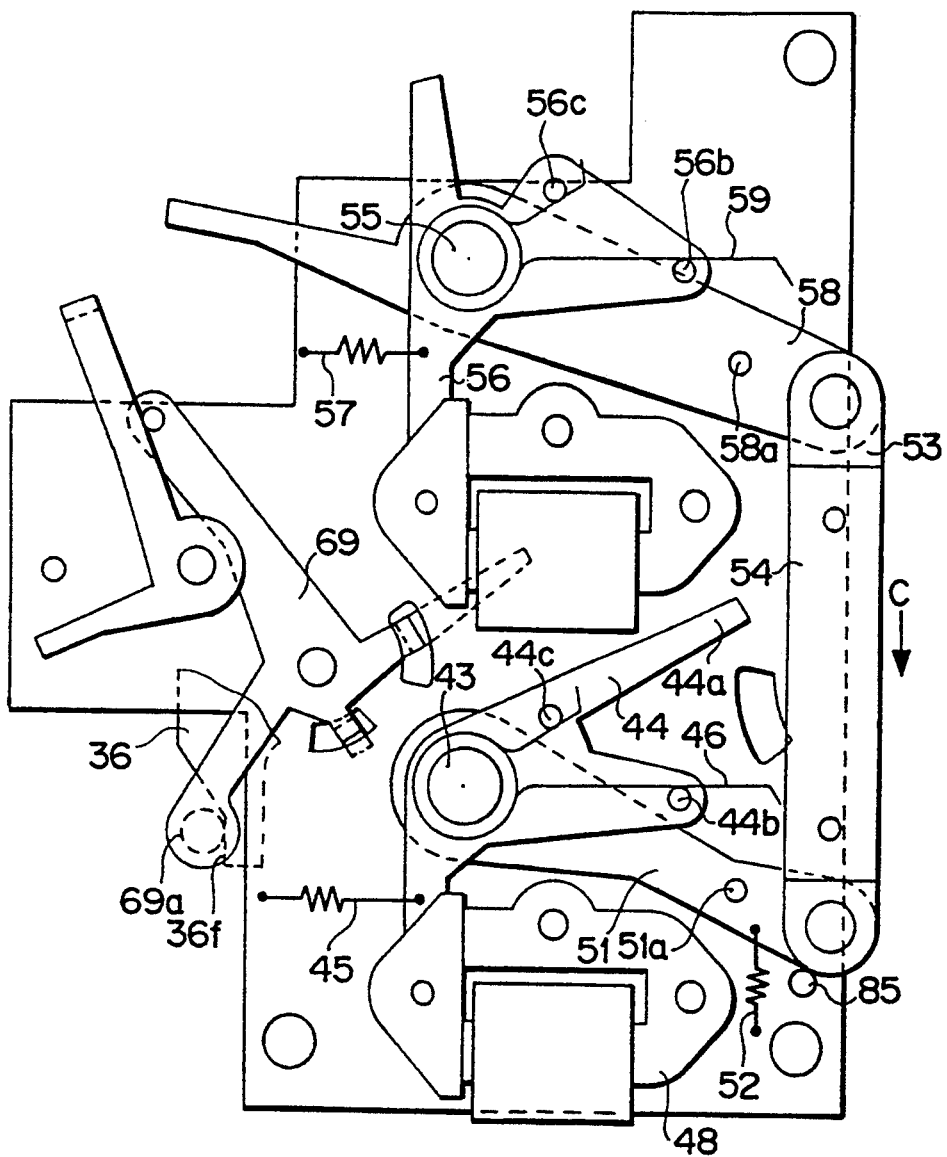
FIG. 3 is a drawing to show the control system of the shutter apparatus in the embodiment.

The inertia body 69 stops when the pin 69a thereof contacts with the end plane 36f of the charge plate 36, as show in FIG. 3. The first overcharge lever 51 and the second overcharge lever 58 rotate clockwise with the action of the spring 52. The link 53 moves in the direction of arrow C as shown in FIG. 3.

Figure 8:
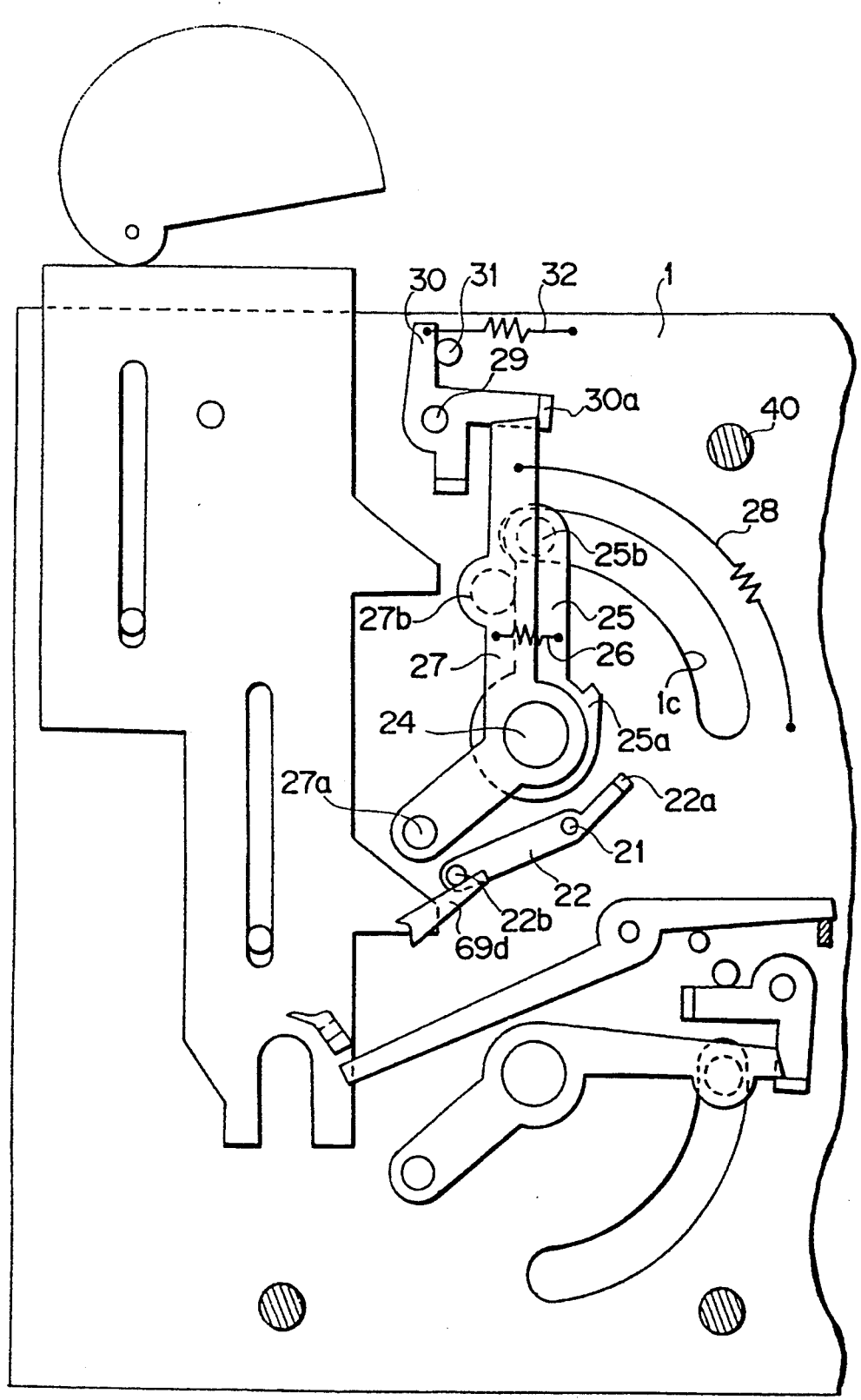
FIG. 8 is a drawing to show the drive system of the shutter apparatus in the embodiment.

Meanwhile, after the engagement between the claw 25a and the folded portion 22a is released, the return lever 25 rotates counterclockwise with the action of the spring 26, as shown in FIG. 8. The first overcharge lever 51 stops when it contacts with the pin 85 fixed in the control base 2, as shown in FIG. 3. Simultaneously, the return lever 25 stops when it contacts with the pin 27b fixed in the rear drive lever 27, as shown in FIG. 8. The both stops are simultaneously performed. The pin 85 is an eccentric pin, which is rotated to adjust the clearance $t_1$ so as to cause the two stops substantially at the same time.

Considering only the point of substantial simultaneous stop, an eccentric pin may be employed as the pin 27b for adjustment, instead of employing the eccentric pin for the pin 85.

However, adjustment of member on the return lever side would change the running start position of the rear slit-forming vane 79, resulting in uneven exposure.

Accordingly, the stop position of the balancer lever is adjusted to avoid such a disadvantage.

Figure 14:
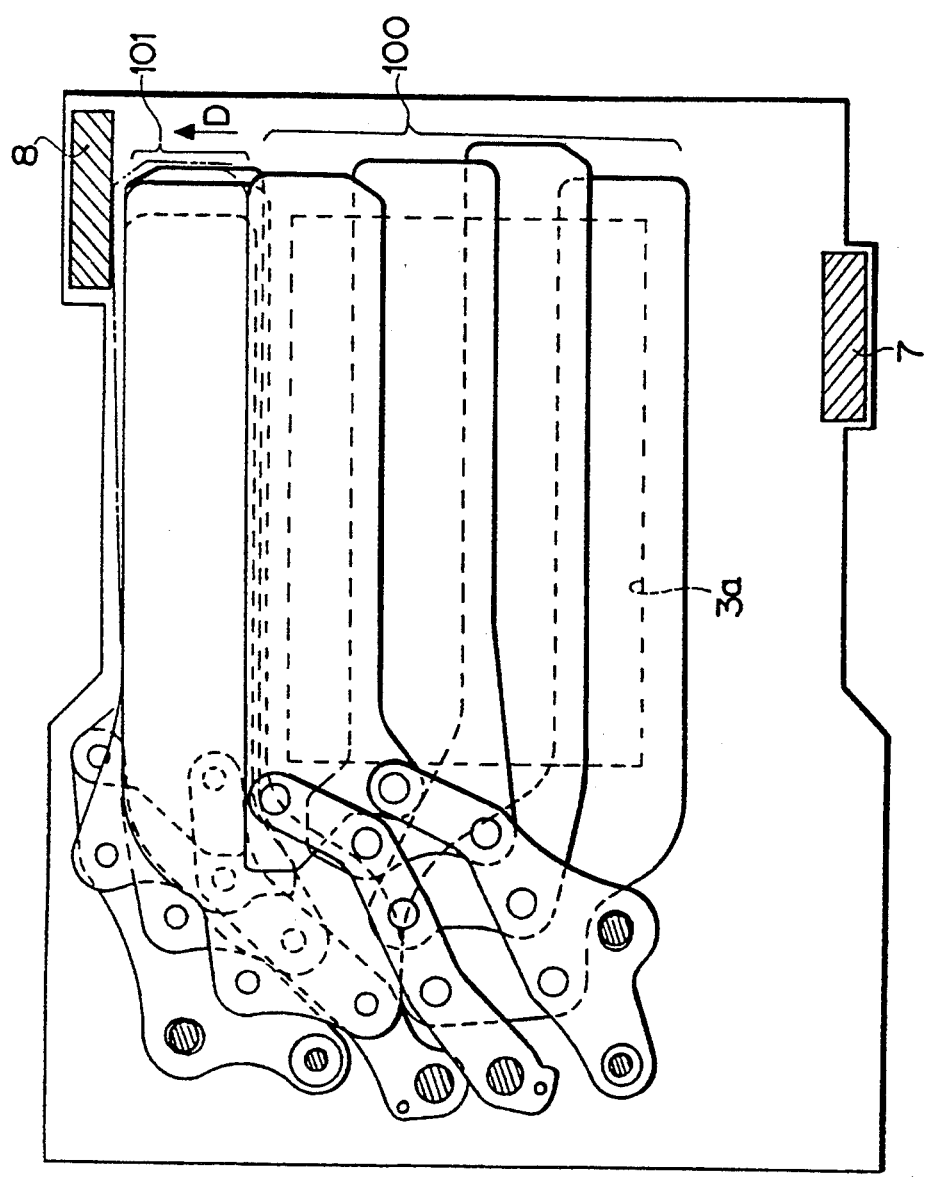
FIG. 14 is a drawing to show the vane system of the shutter apparatus in the embodiment.

By the rotation, the second vane group 101 moves in the direction D as shown in FIG. 14, and only the first vane group 100 covers the photographic opening 3a.

Here, the direction C in which the link moves is opposite to the direction D in which the second vane group 101 moves, so that camera vibration, which could be caused by return motion of the second vane group 101, may be balanced by the balancer weight 54, whereby the camera shake may be prevented.

While the first overcharge lever 51 and the second overcharge lever 58 rotate clockwise with the action of the spring 52, as shown in FIG. 3, the first overcharge spring 46 and the second overcharge spring 59 leave the contact with the pins 51a, 58a, respectively, and come to contact with the pins 44b, 56b, respectively. By this, the first armature lever 44 and the second armature lever 56 come to receive only respective biasing forces of the springs 45, 57.

An elastic member 8 is arranged between the base 1 and the cover plate 3, as shown in FIG. 18, which regulates overrun due to inertia of vanes, as shown by an alternate long and two short dashes line in FIG. 14, while the second vane group 101 moves in the direction D. This can prevent an excessive load from being applied on the shafts 79a, 80a, 81a, 82a, 79b, 80b, 81b, 82b, improving the reliability of shutter.

Also, the elastic member 8 is provided in such a condition that a slight clearance $t_3$ is present as shown in FIG. 15 after the second vane group 101 moves in the direction D and stops. This arrangement prevents the start position of second vane group from being influenced, even if the mount position of elastic member 8 is slightly deviated and while the second vane group 101 moves in the opposite direction to the direction D. This can prevent unevenness of shutter running.

Further, since the elastic member 8 is disposed on the right side of the side line 4b in the recess 4b, 4c, 4d for mounting the finder member, the height of camera body may be reduced. Namely, the camera may be made smaller than a camera arranged to have the elastic member 8 disposed below the bottom line 4c.

Figure 4:
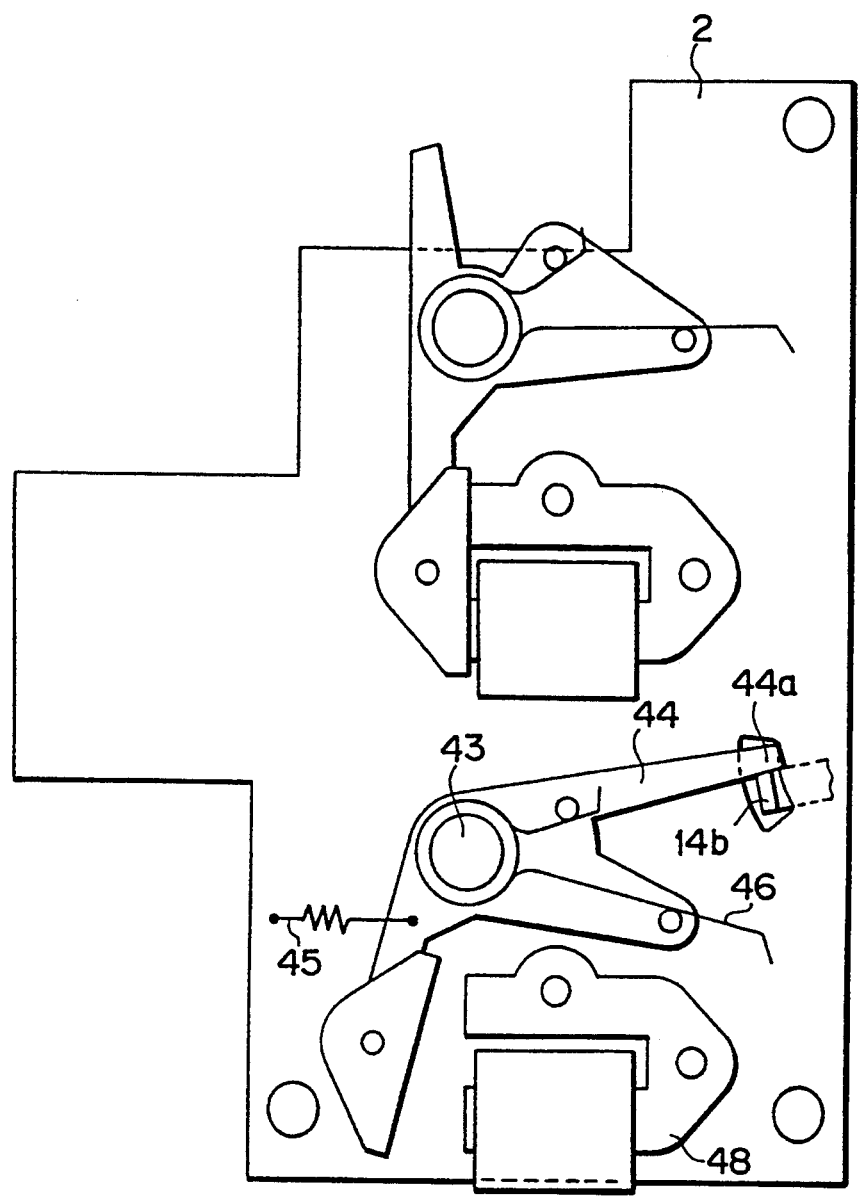
FIG. 4 is a drawing to show the control system of the shutter apparatus in the embodiment.

The first magnet 48 is then deenergized, so that the first armature lever 44 rotates clockwise by the biasing force of the spring 45, as shown in FIG. 4. The arm 44a pushes the folded portion 14b of the first stop key 14 against the spring 15. The first stop key 14 rotates counterclockwise to release the engagement between the folded portion 14a and the claw 11c of the first drive lever 11.

Figure 9:
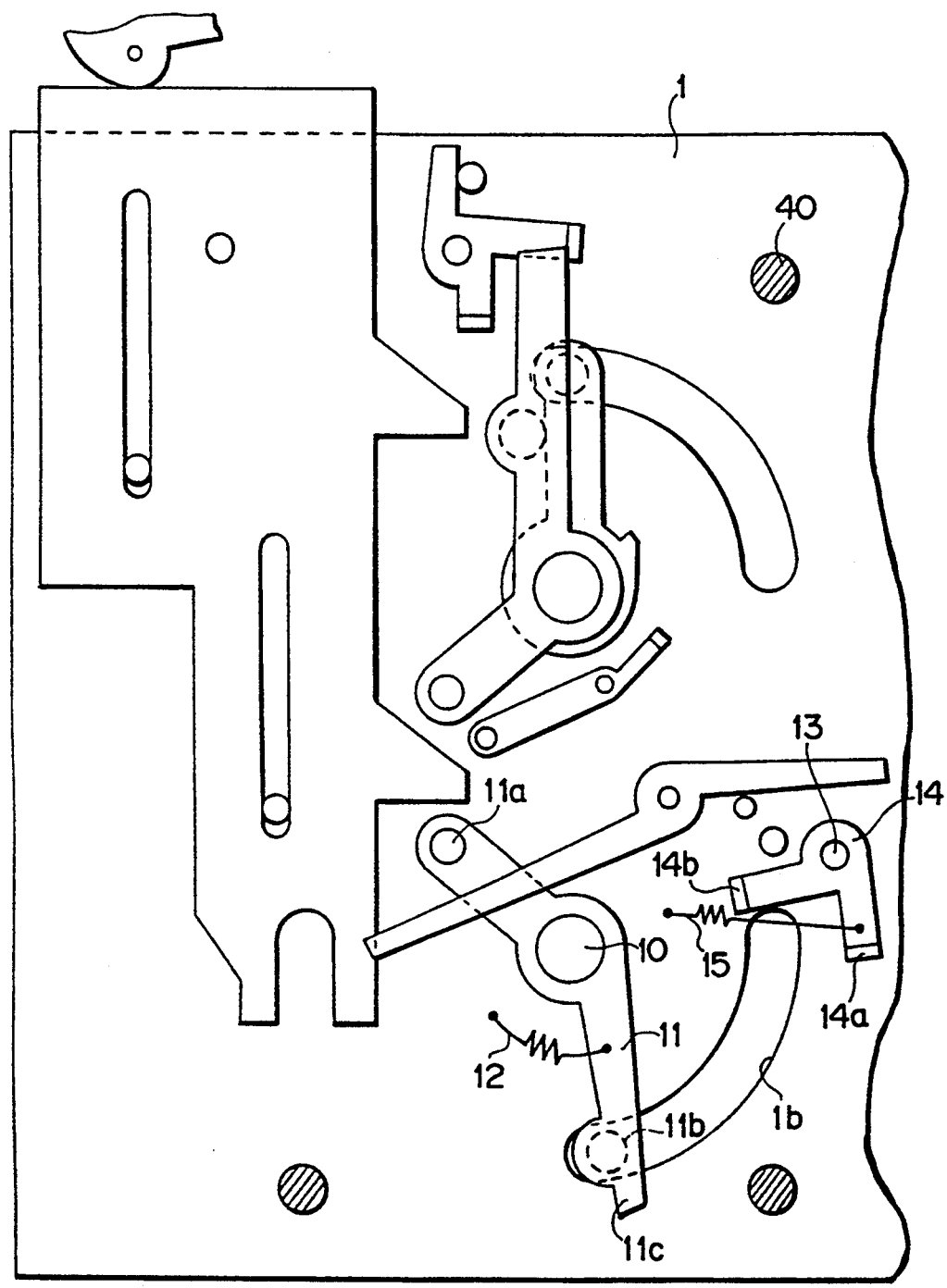
FIG. 9 is a drawing to show the drive system of the shutter apparatus in the embodiment.

The first drive lever 11 rotates clockwise by the biasing force of the spring 12. FIG. 9 shows this state. The shutter blades are in a withdrawn state outside the photographic opening 3a after the first vane group 100 moves in the direction E, as shown in FIG. 15. The photographic opening 3a thus becomes open to perform exposure.

An elastic member 7 is disposed between the base 1 and the cover plate 3, as shown in FIG. 18, which regulates overrun due to inertia of vanes, as shown by an alternate long and two short dashes line in FIG. 15, while the first vane group 100 moves in the direction E. This arrangement may prevent an excessive load from being applied on the shafts 75a, 76a, 77a, 78a, 75b, 76b, 77b, 78b, improving the reliability of shutter.

Figure 5:
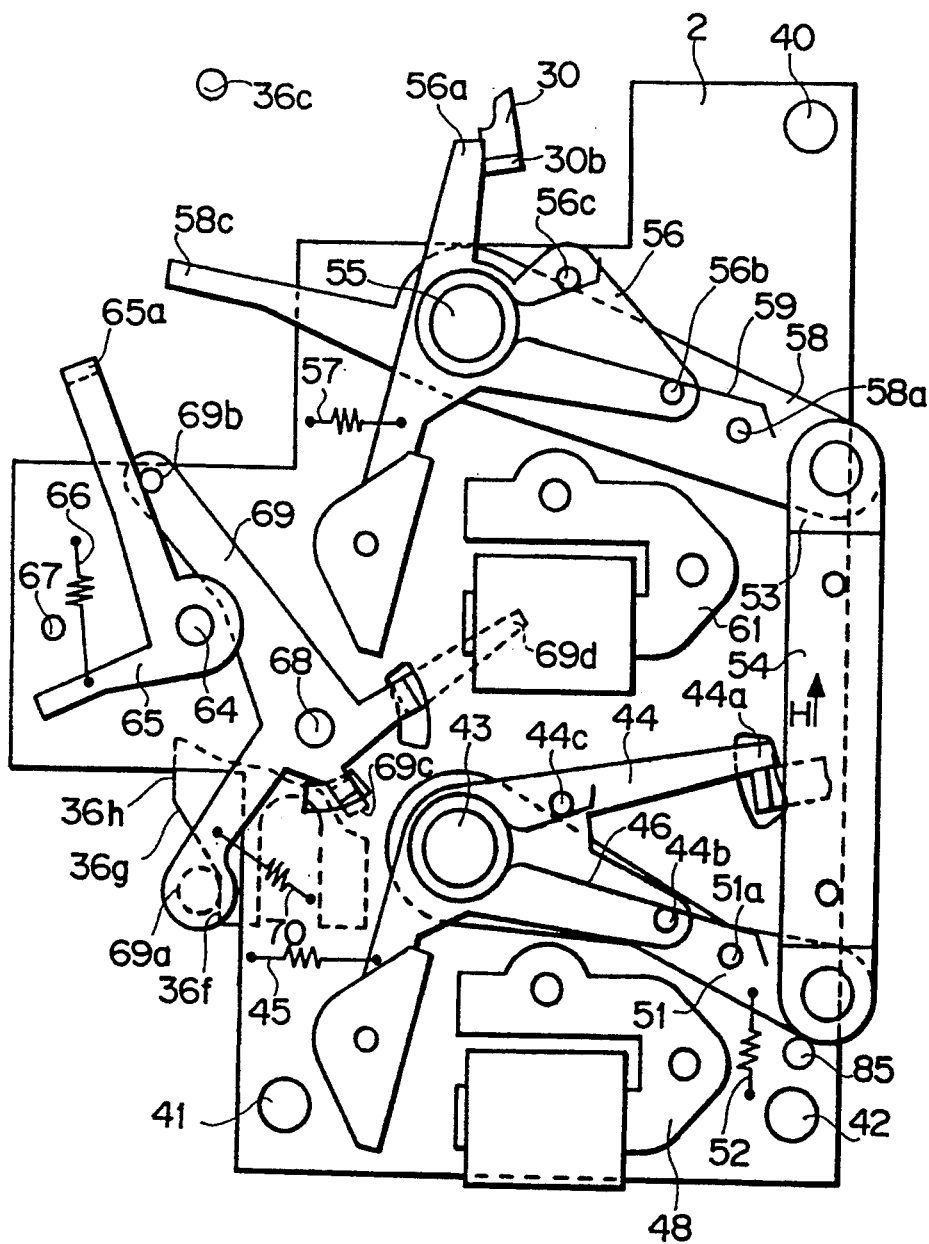
FIG. 5 is a drawing to show the control system of the shutter apparatus in the embodiment.

After a certain exposure time elapsed, the second magnet 61 is then deenergized as shown in FIG. 5. The second armature lever 56 rotates clockwise by the biasing force of the spring 57. The arm 56a pushes the folded portion 30b of the second stop key 30 against the spring 32. The second stop key 30 rotates counterclockwise to release the engagement between the folded portion 30a and the claw 27c of the second drive lever 27.

Figure 10:
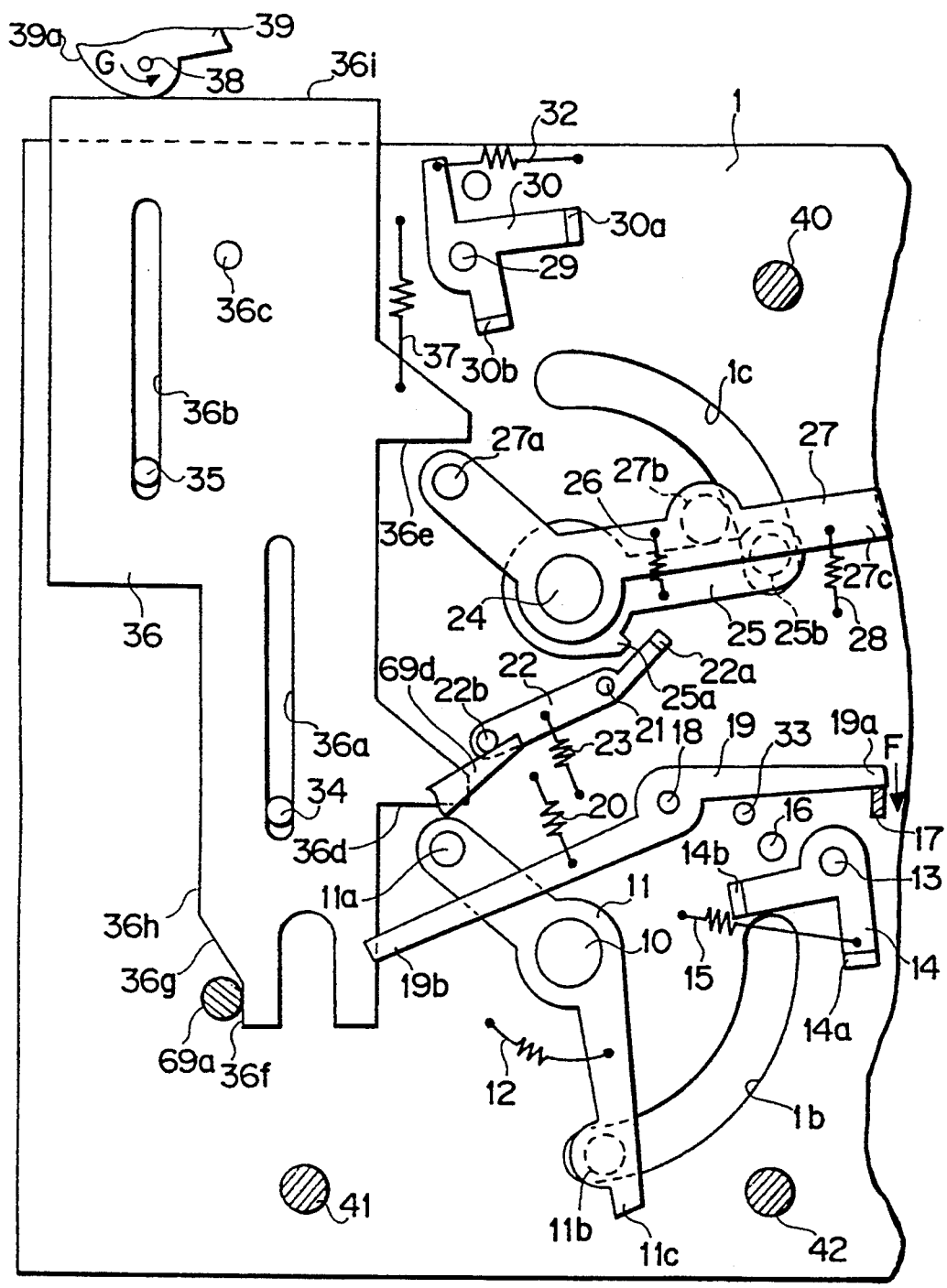
FIG. 10 is a drawing to show the drive system of the shutter apparatus in the embodiment.
Figure 16:
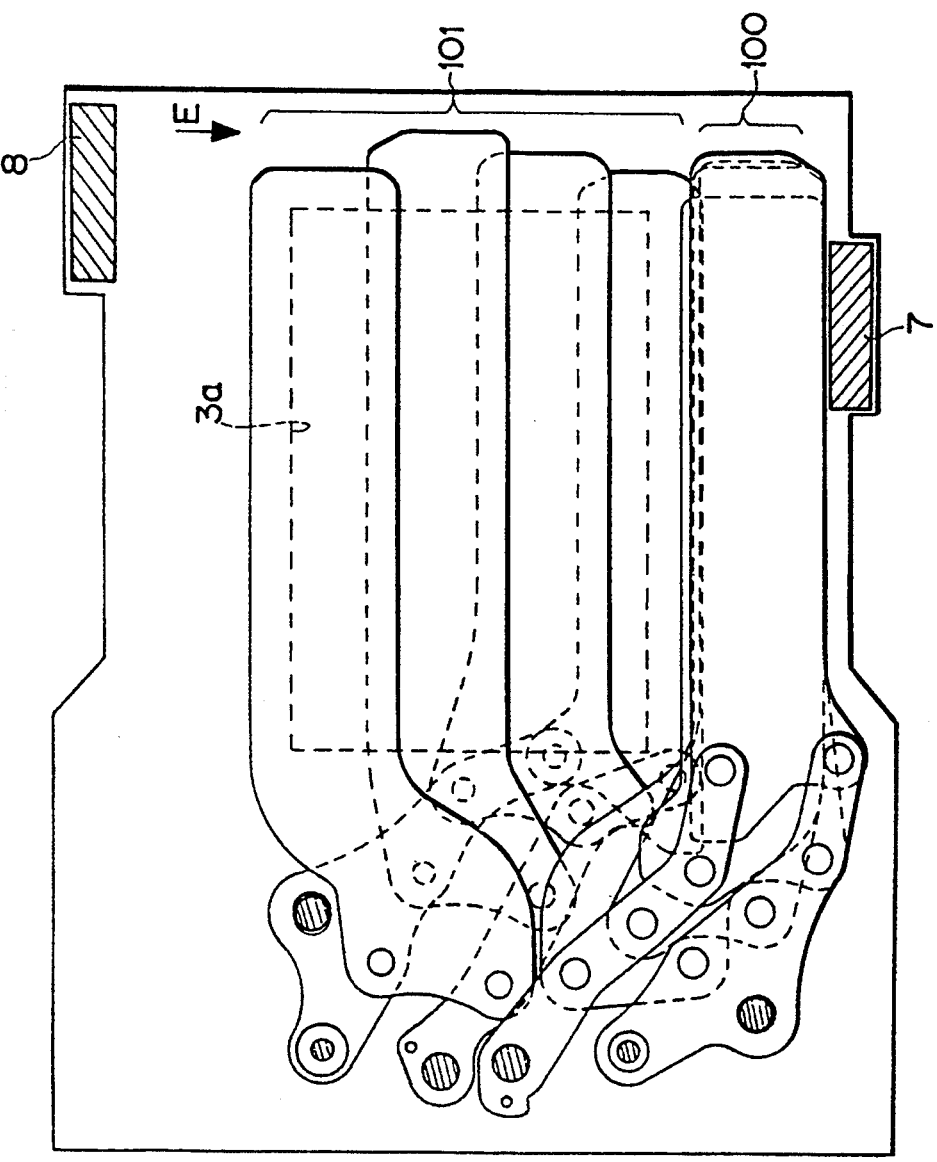
FIG. 16 is a drawing to show the vane system of the shutter apparatus in the embodiment.

The second drive lever 27 rotates clockwise by the biasing force of the spring 28 together with the return lever 25. FIG. 10 shows this state. The shutter blades spread as shown in FIG. 16 while the second vane group 101 moves in the direction E. The photographic opening 3a thus becomes closed to complete the exposure.

Finally, the charge method of the shutter apparatus of this embodiment will be described.

The shutter apparatus is in the state as shown in FIG. 5, FIG. 10, and FIG. 16 at the completion of exposure. From this state, the aperture of lens first becomes open, and the mirror becomes descended. Then, the lever 17 moves in the direction of arrow F in FIG. 10.

The inertia body stop key 19 rotates clockwise by the biasing force of the spring 20. The cam 39 then rotates in the direction of arrow G. By this, the charge plate 36 moves downward against the spring 37.

A protrusion 36d of the charge plate 36 comes to contact with the pin 11a to rotate the first drive lever 11 counterclockwise against the spring 12. Soon after, a protrusion 36e of the charge plate 36 comes to contact with the pin 27a to rotate the second drive lever 27 counterclockwise against the spring 28. Since the return lever 25 is interlocked through the spring 26 with the second drive lever 27, it also rotates counterclockwise.

Figure 11:
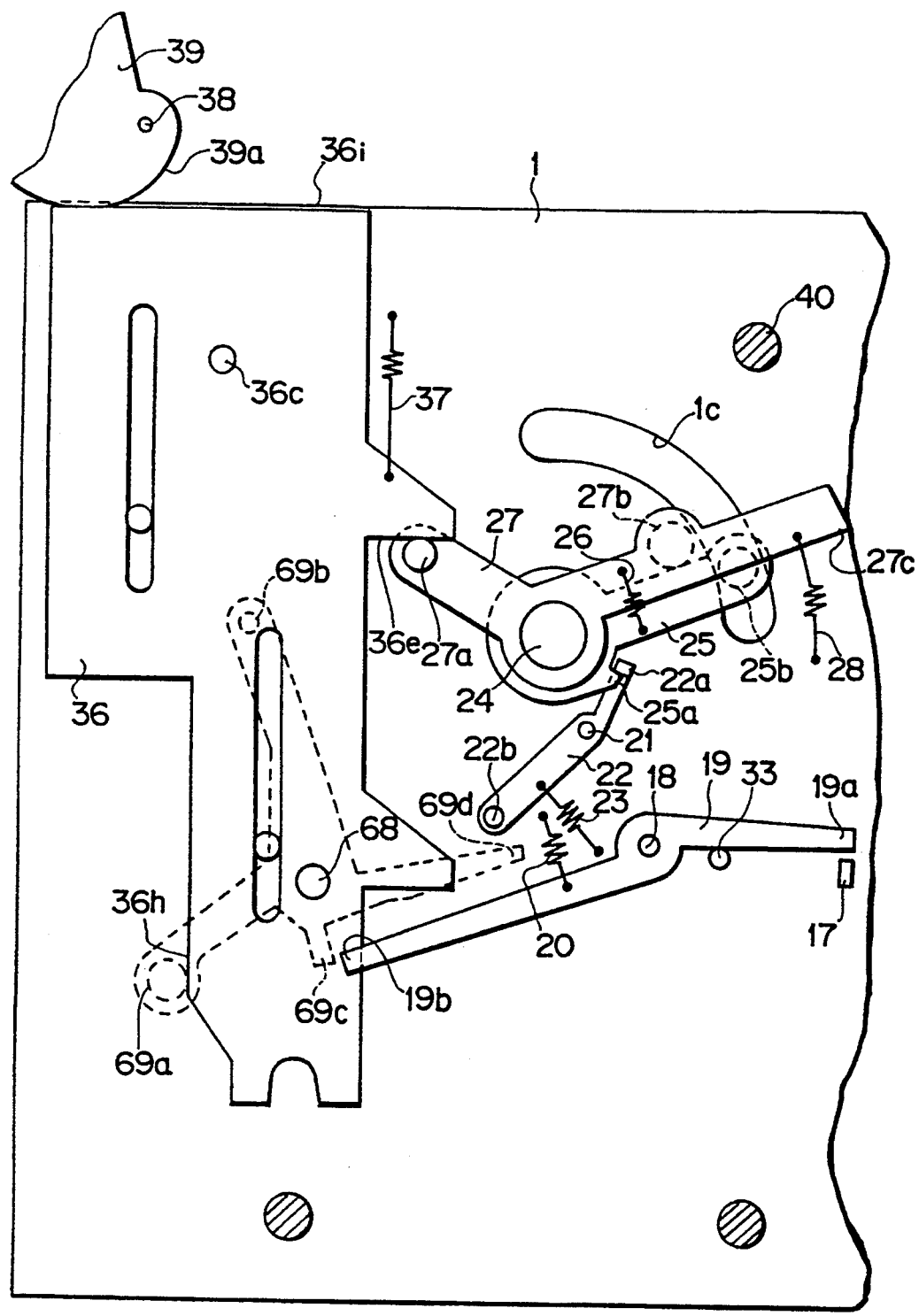
FIG. 11 is a drawing to show the drive system of the shutter apparatus in the embodiment.

Meanwhile, the inertia body 69 rotates clockwise against the spring 70 in FIG. 5 as the pin 69a thereof goes up a slope 36g of the charge plate 36. When the claw 25a comes to a position to engage with the folded portion 22a, the pin 69a has already passed the slope 36g and reached 36h, and a clearance is present between the arm 69d and the pin 22b, as shown in FIG. 11.

Prior to that, the return stop key 22 rotates counterclockwise with the action of the spring 23 and returns to the position of engagement with the return lever 25 accordingly. Thus, the return lever 25 is stopped at the position.

Also, since the pin 69b withdraws clockwise, the balancer stop key 65 rotates clockwise by the biasing force of the spring 66 and returns to the position of contact with the pin 67.

Further, the claw 69c reaches a position over the arm 19b. The charge plate 36 further moves down, thereafter charging the second drive lever 27 together with the first drive lever 11 counterclockwise against the springs 26, 28.

Figure 12:
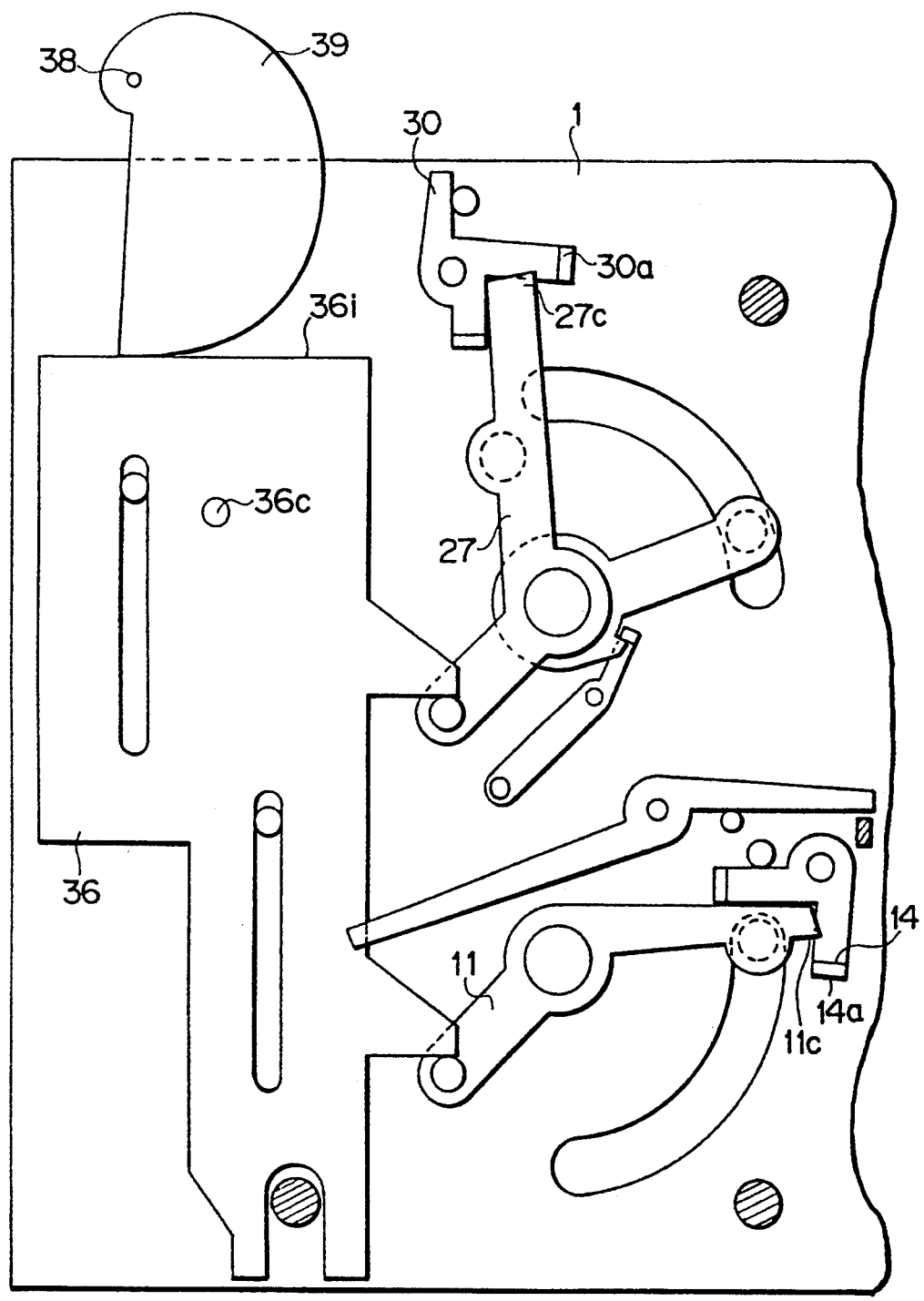
FIG. 12 is a drawing to show the drive system of the shutter apparatus in the embodiment.

When the charge plate 36 reaches the lowermost end, the claw 11c of the first drive lever 11 reaches a position over the folded portion 14a of the first stop key 14, and the claw 27c of the second drive lever 27 reaches a position over the folded portion 30a of the second stop key 30, as shown in FIG. 12.

In FIG. 5, when the charge plate 36 moves down, the pin 36c fixed in the charge plate 36 comes to contact with the claw 58c to push it. The first overcharge lever 51 and the second overcharge lever 58 rotate counterclockwise against the spring 52. By this, the link 53 moves in the direction of arrow H. Namely, the charge of balancer 54 is started.

The pins 51a, 58a come to contact with the first overcharge spring 46 and the second overcharge spring 59 to push them, respectively. Since the springs 46, 59 have the stronger biasing forces than the springs 45, 57, respectively, the first armature lever 44 and the second armature lever 56 rotate counterclockwise against the springs 45, 57, respectively.

Namely, the first armature lever 44 and the second armature lever 56 rotate counterclockwise against the springs 45, 57, respectively, to perform respective return operations of the first armature lever 44 and the second armature lever 56.

Figure 6:
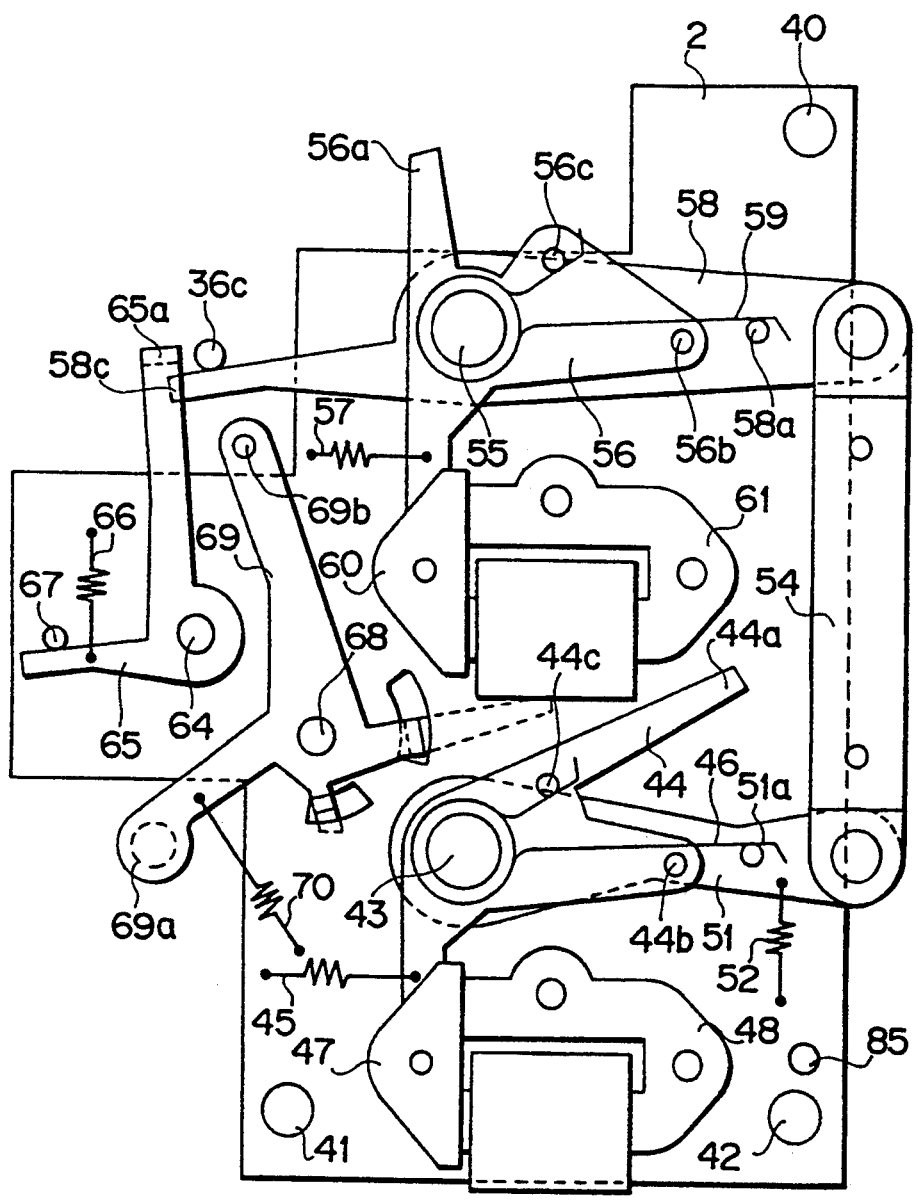
FIG. 6 is a drawing to show the control system of the shutter apparatus in the embodiment.

As shown in FIG. 6, when the charge plate 36 reaches the lowermost end, the iron pieces 47, 60 come to contact with the first magnet 48 and the second magnet 61, respectively. Further, clearances exist between the pins 44b, 56b and the first and second overcharge springs 46, 59, respectively, and the claw 58c reaches a position over the folded portion 65a.

When the cam 39 completes one rotation and stops, the charge plate 36 returns up by the biasing force of the spring 37. Thus, the claws 11c, 27c are engaged with the folded portions 14a, 30a, respectively, the claw 69c with the arm 19b, and the claw 58c with the folded portion 65a, returning to the state as shown in FIG. 1, FIG. 7, and FIG. 13. By this, a photographic operation is completed.

In the present embodiment the dedicated balancer member is provided to operate in synchronism with the withdrawal operation of the second vane group outside the image plane, so that the balancer member does not have to be arranged as double lever, achieving the shutter apparatus with built-in balancer which can be readily set in a camera body having an autofocus apparatus.

Also in the present embodiment, the reset member indispensable in the shutter apparatus, which controls the running of first vane group and second vane group with two electromagnetic devices, is arranged as the quadric link work, and the balancer member is set on the quadric link work as serving as the balancer as well as the reset member, achieving the shutter apparatus with built-in balancer in the arrangement with little increase in number of components.

What is claimed is:

1. A focal-plane shutter apparatus wherein an aperture can be doubly covered with a first vane group and a second vane group and, responsive to release of a shutter, said second vane group withdraws from said aperture and thereafter said first vane group runs across said aperture to start an exposure, comprising:
 a balancer member which moves in an opposite direction to the withdrawal direction of said second vane group in synchronism with the withdrawal movement of said second vane group from said aperture; and
 a start adjusting member which is adjustable to relatively adjust the starting of the movement of said balancer member and the starting of the withdrawal of said second vane group to occur substantially simultaneously.

2. A focal-plane shutter apparatus according to claim 1, wherein said start adjusting member is an eccentric pin provided in a mirror rise and aperture transmission path.

3. A focal-plane shutter apparatus wherein an aperture can be doubly covered with a first vane group and a second vane group and, responsive to release of a shutter, said second vane group withdraws from said aperture and thereafter said first vane group runs across said aperture to start an exposure, comprising:
 a balancer member which moves in an opposite direction to the withdrawal direction of said second vane group in synchronism with the withdrawal movement of said second vane group from said aperture; and
 a stop adjusting member which is adjustable to relatively adjust the stopping of the movement of said balancer member and the completion of the withdrawal of said second vane group to occur substantially simultaneously.

4. A focal-plane shutter apparatus according to claim 3, wherein said stop adjusting member is an eccentric pin for adjusting a stop timing of said balancer member.

5. A focal-plane shutter apparatus wherein an aperture can be doubly covered with a first vane group and a second vane group and, responsive to release of a shutter, said second vane group withdraws from said aperture and thereafter said first vane group runs across said aperture to start an exposure, comprising:
 a balancer member which moves in opposite direction to the withdrawal direction of said second vane group in synchronism with the withdrawal movement of said second vane group from said aperture; and
 an adjusting mechanism which is adjustable to relatively adjust the starting of the movement of said balancer member and the starting of the withdrawal of said second vane group to occur substantially simultaneously, and to relatively adjust the stopping of the movement of said balancer member and the completion of the withdrawal of said second vane group to occur substantially simultaneously.

* * * * *